UNITED STATES PATENT OFFICE.

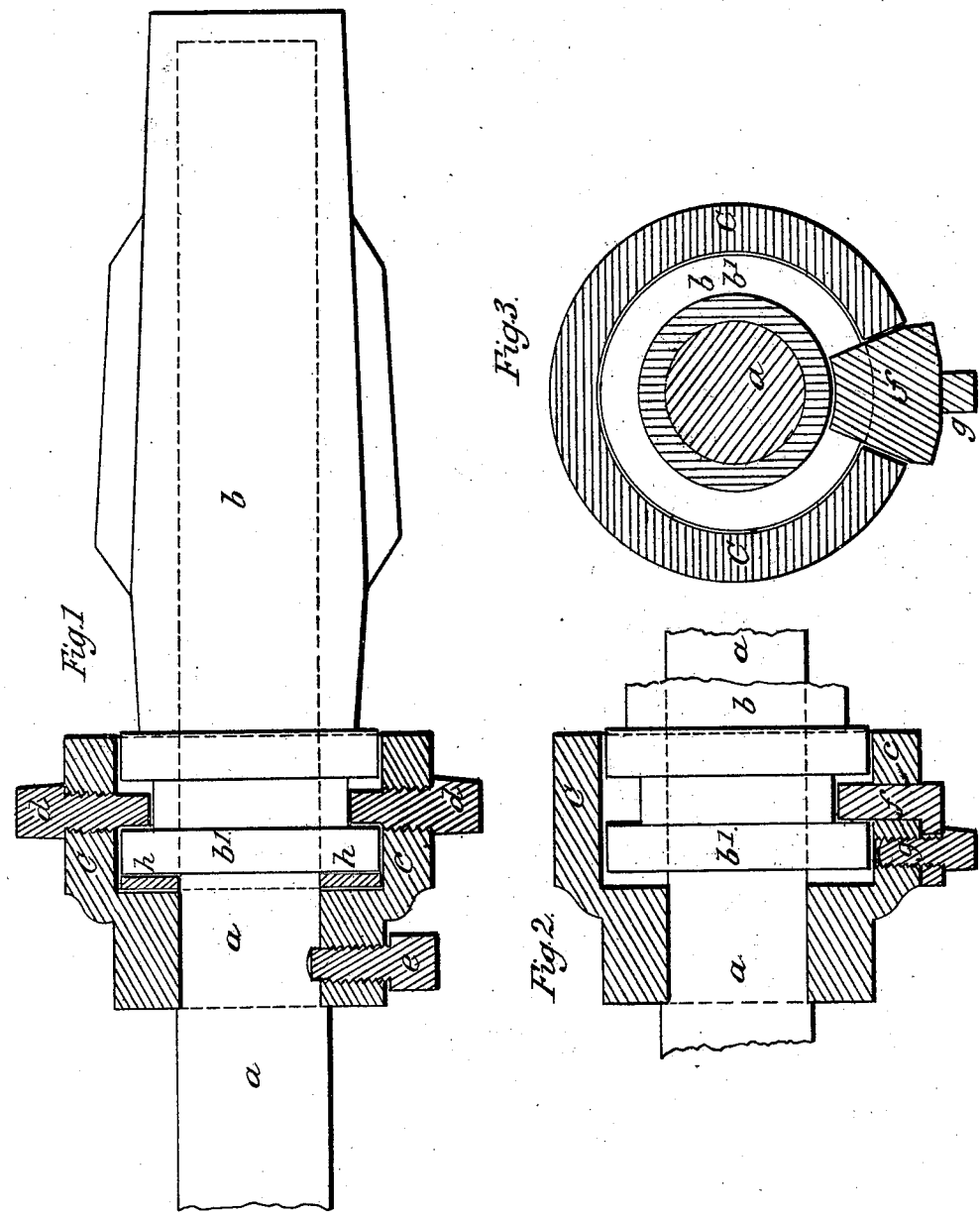

L. SMITH, JR., AND G. R. WARING, OF DERBY, CONNECTICUT.

METHOD OF SECURING BOXES OF CARRIAGE-WHEEL HUBS TO THEIR AXLES.

Specification of Letters Patent No. 1,640, dated June 17, 1840.

*To all whom it may concern:*

Be it known that we, LYMAN SMITH, Jr., and GRIFFIN R. WARING, both of Derby, in New Haven county and State of Connecticut, have invented an Improvement in Carriage and other Axletrees and Boxes; and we do hereby declare that the following is a full and exact description thereof, reference being had to the accompanying sheet of drawings, which makes part of this specification.

The parts represented in the several figures of the drawings are the following, viz: $a$, axle; $b$, box; $b'$, combination flange of box; $c$, combination cap of axle; $d$, combination set-screw; $e$, binding screw of cap $c$; $f$, key combining cap $c$ and collar $b'$; $g$, binding screw of key $f$.

We form the box as represented at $b$, $b'$, Figure 1. The box may be closed at its outer end, and at the inner end we form a flange $b'$. A cap, $c$, is placed on the arm of the axle, $a$, and secured by a screw, $e$, the point of which screw enters a bed formed to receive it in the arm of the axle, as shown in Fig. 1. The inner end $b'$ of the box enters the cup-like cavity of the cap, $c$, and reaches nearly to the bottom of said cavity. Between the inner end of the box and the bottom of said cavity we place a packing, $h$, of leather or other suitable material to retain oil in the box, and we secure the box in its place on the axle by means of one or more setscrews, $d$, screwed through the cap, $c$, and having their points extending within the cap, $c$, and in front of the flange, $b'$, as shown in Fig. 1, or by means of a key, $f$, which passes through a slot or mortise in the cap, $c$, the inner extremity of said key, $f$, extending in front of the flange, $b'$, of the box within said cap, as shown in Figs. 1 and 2. The key, $f$, is secured in its place in the cap, $c$, by the screw, $g$.

What we claim as our invention and wish to secure by Letters Patent is—

The method of securing the box or wheel in its place on the axle by means of the flange, $b'$, of the box, the cap, $c$, of the axle and the setscrews, $d$, or the key, $f$, in the manner herein described and represented in the accompanying drawings, instead of using a linchpin or nut on the end of the axle, or any other method heretofore used.

LYMAN SMITH, JR. [L. S.]
    GRIFFIN R. WARING. [L. S.]

Witnesses:
    LYMAN OSBORN,
    GILBERT FLORLENCE.